United States Patent [19]

Stevens et al.

[11] Patent Number: 4,739,852
[45] Date of Patent: Apr. 26, 1988

[54] FINAL DRIVE MECHANISM FOR A VEHICLE

[75] Inventors: Samuel B. Stevens, Pekin; Danny J. Becker, Peoria, both of Ill.

[73] Assignee: Caterpillar Inc., Peoria, Ill.

[21] Appl. No.: 94,061

[22] Filed: Sep. 4, 1987

Related U.S. Application Data

[63] Continuation of Ser. No. 922,437, Oct. 23, 1986, abandoned.

[51] Int. Cl.$^4$ .............................................. B60K 17/00
[52] U.S. Cl. .................................... 180/70.1; 180/71; 305/29
[58] Field of Search ................... 180/70.1, 71, 9.1, 6.7; 305/24, 27, 29, 30

[56] References Cited

U.S. PATENT DOCUMENTS

| | | | |
|---|---|---|---|
| 1,975,417 | 10/1934 | Defour | 180/19 |
| 2,779,636 | 1/1957 | Allen | 305/27 |
| 2,939,346 | 6/1960 | McCarthy et al. | 74/801 |
| 3,276,823 | 10/1966 | Tucker, Jr. | 305/11 |
| 3,382,943 | 5/1968 | Anderson | 180/9.1 |
| 3,802,289 | 4/1974 | Cheek | 74/411.5 |
| 3,872,939 | 3/1975 | Eckert | 180/6.48 |
| 3,885,642 | 5/1975 | Miller et al. | 180/9.2 R |
| 3,960,230 | 6/1976 | Van Wuytswinkel | 180/9.62 |
| 4,155,415 | 5/1979 | van der Lely | 180/22 |
| 4,392,396 | 7/1983 | Sato et al. | 74/785 |

FOREIGN PATENT DOCUMENTS

| | | |
|---|---|---|
| 389541 | 2/1924 | Fed. Rep. of Germany . |
| 1755168 | 12/1971 | Fed. Rep. of Germany . |
| 2062558 | 5/1981 | United Kingdom . |

*Primary Examiner*—Kenneth R. Rice
*Attorney, Agent, or Firm*—Charles E. Lanchantin, Jr.

[57] ABSTRACT

A final drive mechanism for an earthmoving excavator or the like includes a drive wheel assembly defining an inner side portion, and outer side portion, and a shaft assembly releasably connecting the side portions together and defining an annular gap therebetween. A hollow frame extends radially inwardly through the gap and rotatably supports the wheel assembly at a location laterally away from the central longitudinal plane of the excavator, and a gear train within the hollow frame powerably rotates the wheel assembly through a torque transmitting path directed radially inwardly through the gap. The gear train includes a planetary gear set and two interconnected cluster gears to obtain the desired speed ratio reduction. The mechanism is particularly adaptable to driving an endless drive belt entrained about the drive wheel assembly and an idler wheel assembly, and is compactly contained primarily within the space envelope of the drive belt. The drive belt loads are effectively directed from the drive wheel assembly into the hollow frame and into the roller frame of the excavator.

20 Claims, 4 Drawing Sheets

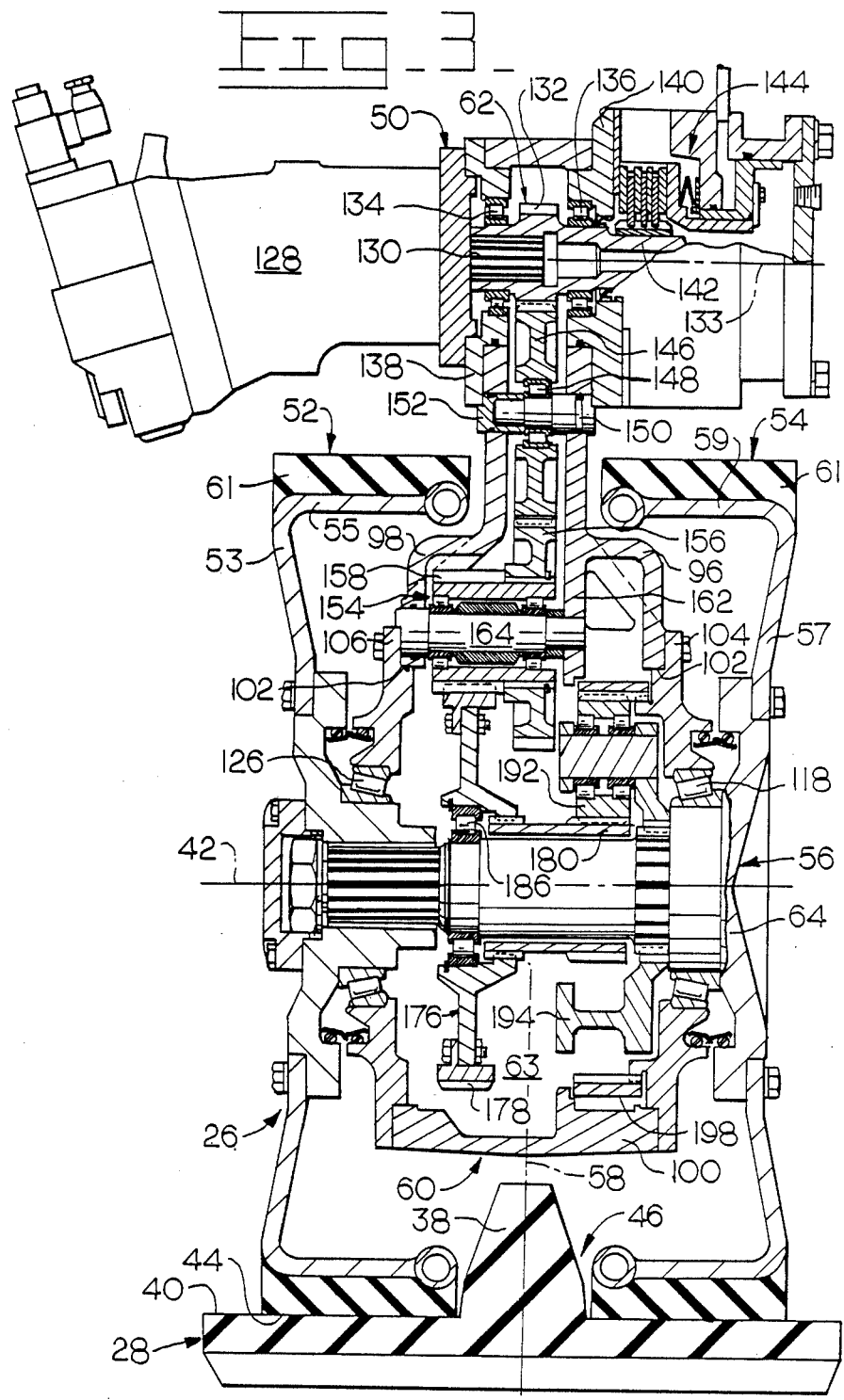

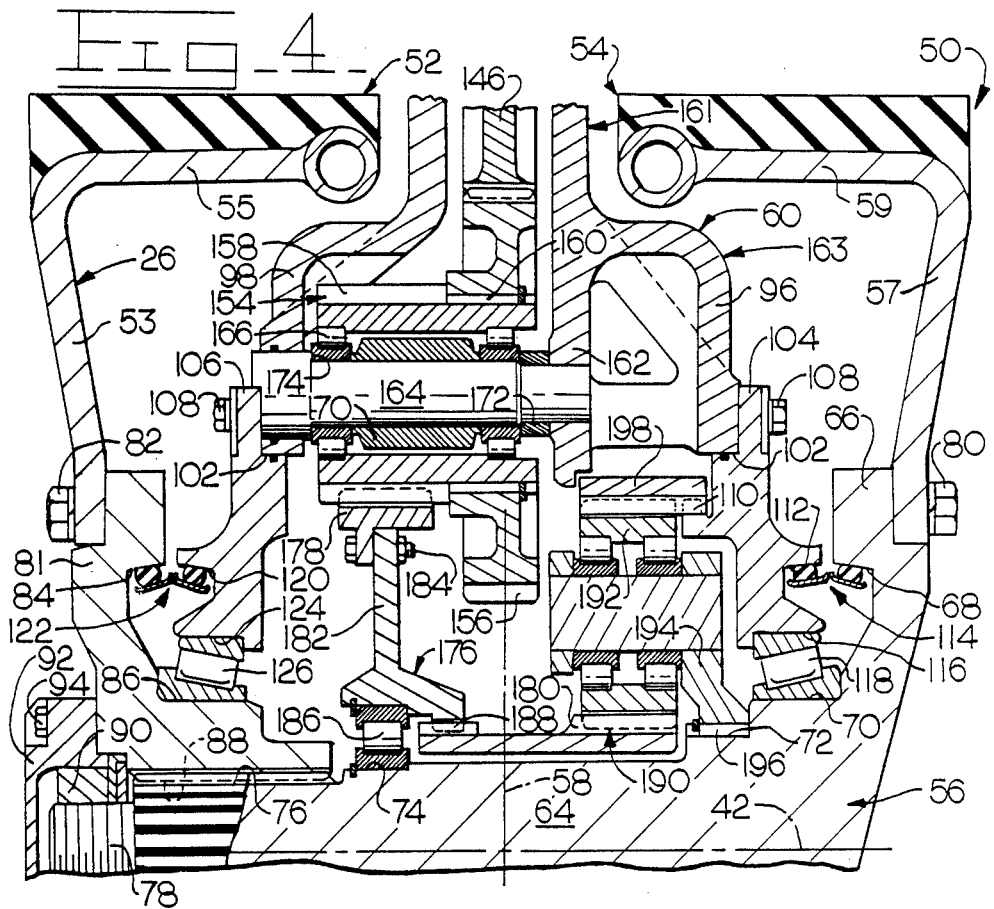
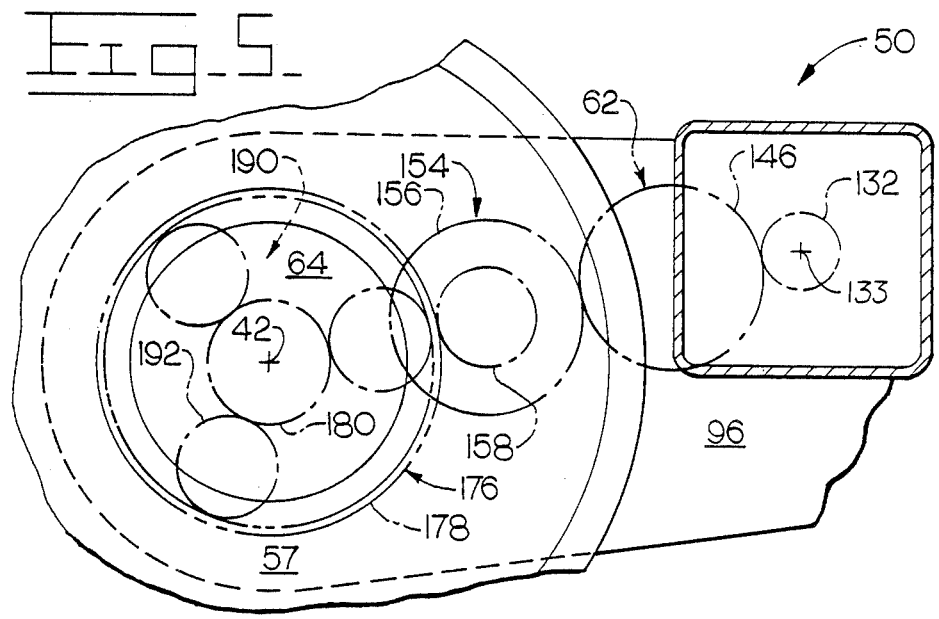

U.S. Patent   Apr. 26, 1988   Sheet 4 of 4   4,739,852
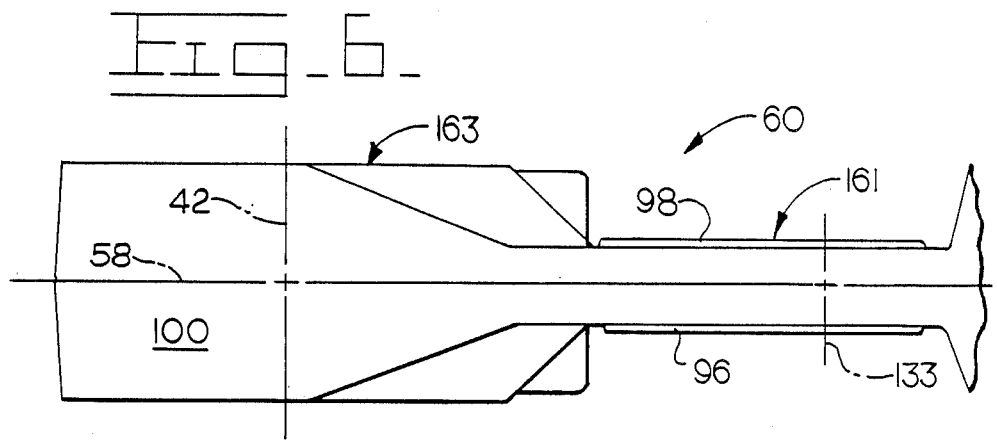
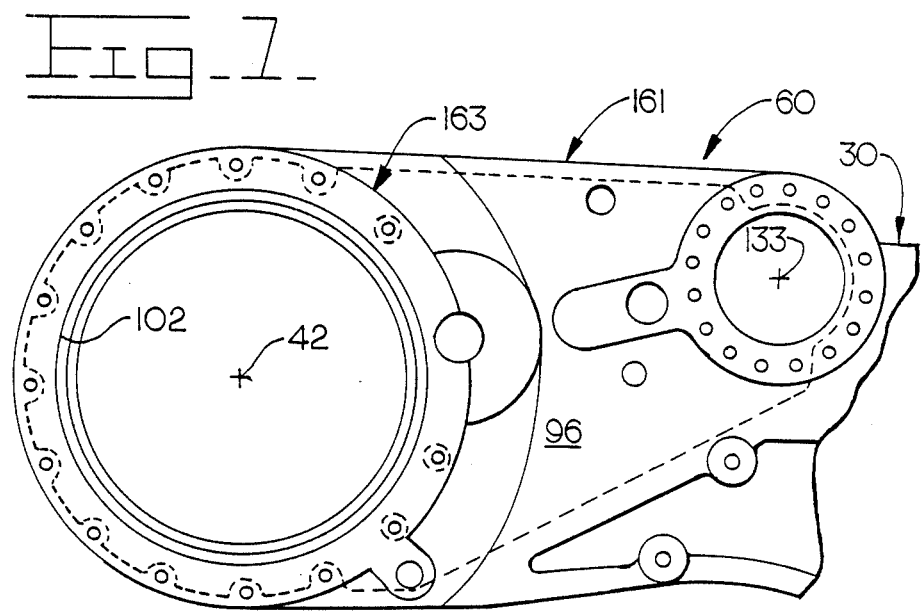

FINAL DRIVE MECHANISM FOR A VEHICLE

This is a continuation of Ser. No. 922,437, filed Oct. 23, 1986, now abandoned.

DESCRIPTION

1. Technical Field

This invention relates to a final drive mechanism for a vehicle, and more particularly to the structure of a wheel assembly and the final drive mechanism for supporting and driving it.

2. Background Art

Many track driven excavators use a fluid motor for powerably rotating the track chain driving sprocket through a speed reducing final drive assembly. The rear drive sprocket, front idler, and a plurality of supporting rollers are mounted on a longitudinally extending track roller frame, and a case extends laterally inwardly from the track roller frame to contain a final drive gear train and to support the fluid motor for powering the gear train. U.S. Pat. No. 3,872,939 issued Mar. 25, 1975 to H. L. Eckert, and U.S. Pat. No. 3,960,230 issued June 1, 1976 to C. M. G. Van Wuytswinkel illustrate such excavator final drive mechanisms.

In order to avoid the disadvantages associated with conventional multi-jointed and metallic track chains for vehicles of the aforementioned excavator type, an increasing amount of interest has developed for employing a continuous elastomeric or rubber belt entrained about a pair of longitudinally spaced wheels for propulsion and support. The generally cylindrical driving wheel that is required to give proper support for, and sufficient area of contact with, the belt is substantially wider than the usual sprocket so that it is no longer convenient and simple to reach around the wheel or to reach in from one side in a cantilevered manner to provide the desired bearing support therefor. Moreover, the final drive housing containing the reduction gear train driven by the hydraulic motor must be constructed to provide the necessary clearances from the wheel and the belt so that the width of the final drive mechanism becomes excessive. Still further, there is the need for transferring relatively high belt tension loads from the wheel support bearings and through the final drive housing to the track roller frame.

Accordingly, what is needed is a simple and yet reliable final drive mechanism for rotatably supporting and powerably driving a relatively wide wheel assembly engaged by an endless belt, and which is compactly contained primarily within the space envelope of the belt. Preferably, the final drive mechanism should not add excessive width to the wheel assembly and should transfer belt loads from the wheel support bearings in a generally symmetrical manner with respect to the longitudinal midplane of the wheel assembly. By avoiding the relatively uneven deflection of the usual cantilevered final drive housing, the size and weight of the final drive mechanism can be minimized. And still further, the final drive mechanism should provide a compact gear train having a plurality of speed reduction stages for effectively driving the wheel assembly at the desired reduced speed with respect to the driven input member.

The present invention is directed to overcoming on or more of the problems as set forth above.

DISCLOSURE OF THE INVENTION

In accordance with one aspect of the present invention, a final drive mechanism includes a wheel assembly having an axially inner side portion, an axially outer side portion and shaft means for releasably connecting the side portions together and defining an annular peripheral gap therebetween. The final drive mechanism further includes hollow frame means for supporting the wheel assembly laterally away from the central longitudinal plane of the vehicle by extending radially inwardly through the gap, and gear train means for powerably rotating the wheel assembly through a torque transmitting path directed radially inwardly through the gap and with the gear train means being disposed substantially within the hollow frame means.

In accordance with another aspect of the present invention, a final drive mechanism includes a wheel assembly having axially inner and outer side portions and defining a substantially cylindrical envelope and a relatively narrow annular gap between the side portions, hollow frame means extending solely radially inwardly between the side portions through the gap for rotatably supporting the wheel assembly, and gear train means including a plurality of interconnected gears defining two speed reduction gear sets mounted within the hollow frame means and located within the envelope for driving the wheel assembly.

In accordance with a still further aspect of the invention, a final drive mechanism is provided for a vehicle having first and second wheel assemblies and a drive belt entrained about the wheel assemblies. The first wheel assembly has inner and outer side portions and means for releasably connecting the side portions together and defining an annular peripheral gap between them. Hollow frame means extend generally radially inwardly through the gap and rotatably supports the first wheel assembly laterally away from the central longitudinal plane of the vehicle. The hollow frame means includes inner and outer bearing assemblies for transferring forces from the drive belt upon the side portions of the first wheel assembly to the hollow frame means. The final drive mechanism also includes a gear train for driving the first wheel assembly which passes radially inwardly through the gap within the hollow frame and includes a plurality of gears within the first wheel assembly.

Preferably, the gear train for driving the first wheel assembly includes a first cluster gear, a second cluster gear driven by the first cluster gear and defining a sun gear, and a planetary gear set including a ring gear nonrotatably connected to the hollow frame, a planet carrier connected for joint rotation with the wheel assembly and a plurality of planet gears mounted on the carrier which intermesh with the ring gear and are driven by the sun gear of the second cluster gear. The first cluster gear has a large diameter gear thereof which is substantially located on the mid longitudinal plane of the wheel assembly and which is driven by a hydraulic motor through one or more gears arranged on the plane and located exteriorly of the envelope of the wheel assembly.

BRIEF DESCRIPTION OF THE DRAWINGS

FIG. 3 is a developed, diagrammatic and enlarged sectional view of the final drive mechanism of FIG. 1 taken along line III—III thereof.

FIG. 4 is an enlarged cross sectional view of a portion of FIG. 3 to better show details of construction thereof.

FIG. 5 is a diagrammatic side elevational view of the final drive mechanism of the present invention at an enlarged scale from that shown in FIG. 1 to better illustrate the disposition of certain elements of the gear train.

FIG. 6 is a fragmentary and enlarged top plan view of the rear portion of the roller frame shown in FIG. 1 solely illustrating the construction of the supporting hollow frame in greater detail.

FIG. 7 is a fragmentary side elevational view of the hollow frame shown in FIG. 6.

DESCRIPTION OF THE PREFERRED EMBODIMENT

Figure 1:
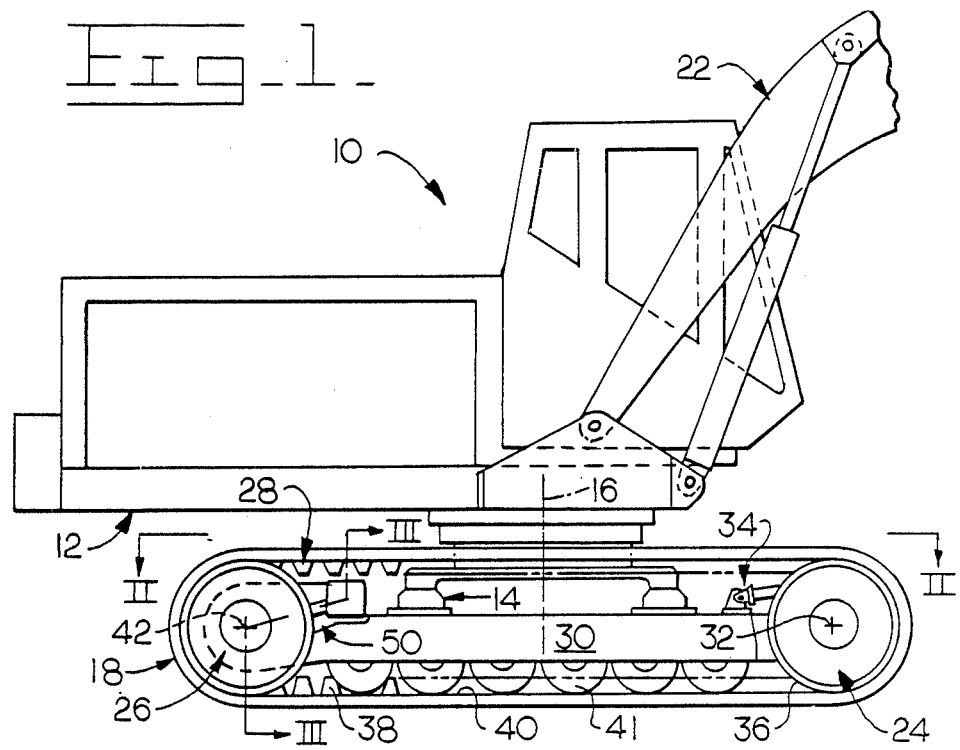
FIG. 1 is a fragmentary, diagrammatic side elevational view of an earthmoving excavator employing the final drive mechanism of the present invention.
Figure 2:
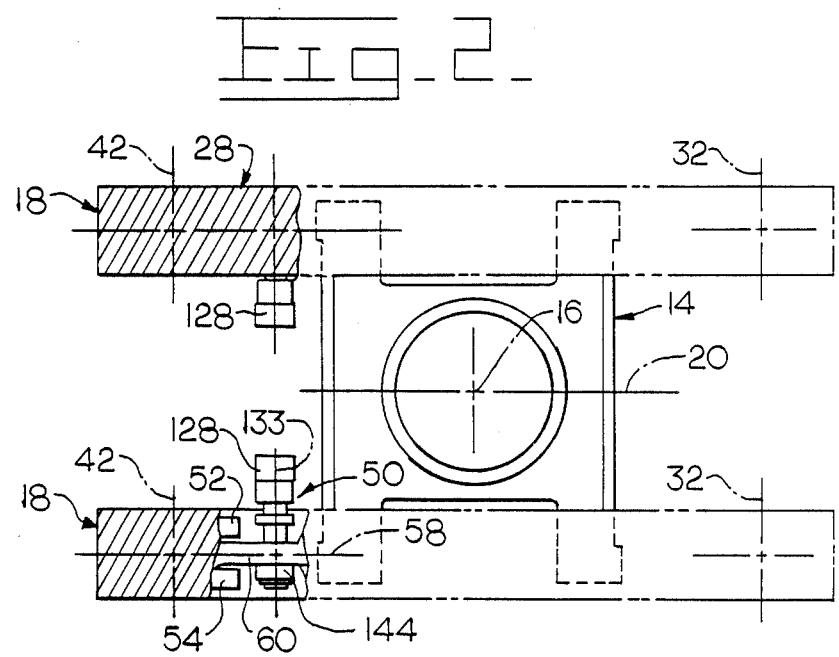
FIG. 2 is a diagrammatic top plan view of the undercarriage portion of the excavator of FIG. 1 taken along line II—II thereof.

FIGS. 1 and 2 illustrate a vehicle 10 such as an earthmoving excavator having a superstructure 12 mounted on a car body 14 for rotation about a vertical axis 16. In turn, the car body is supported on substantially parallel undercarriage assemblies 18 displaced laterally about the same distance from a central longitudinal plane 20 passing through the vertical axis. An implement 22, only a portion of which is shown, is adapted to move earth or to otherwise accomplish a work task in a well known manner.

Each of the undercarriage assemblies 18 includes a front idler wheel assembly 24, a rear drive wheel assembly 26 and an endless drive belt 28 entrained about the wheel assemblies. Preferably, the drive belt utilized is an appropriately internally reinforced elastomeric or rubber belt of the endless band type formed into a closed loop. The front idler wheel assembly 24 is mounted on a longitudinally extending roller frame 30 in such a way that it has a movable axis 32. Support and loading means 34, only partially illustrated in FIG. 1, is incorporated for continually urging the front idler wheel assembly longitudinally forwardly or to the right when viewing the drawings. Such loading means maintains a relatively high and constant tension level upon the drive belt 28 and controllably recoils or moves rearwardly for absorbing energy when an object finds its way between the belt and wheel assembly, or when the front of the belt contacts an external obstacle. The front idler wheel assembly has a relatively rigid and radially outwardly facing surface 36 of substantially cylindrical shape divided in two by a peripheral guide channel, not shown, for receiving a plurality of guide blocks 38 that extend inwardly from a relatively flat interior surface 40 of the belt.

The car body 14 of the excavator 10 is supported by the opposite roller frames 30, and the weight of the car body and superstructure 12 is transferred through a plurality of roller wheels 41 connected to the roller frame and through the drive belt 28 to the ground.

The rear drive wheel assembly 26 frictionally transmits power to the drive belt 28 and has a fixed horizontal and transverse axis 42. As is shown best in FIG. 3, the rear drive wheel assembly defines a relatively rigid and radially outwardly facing cylindrical surface or a substantially cylindrical envelope 44 significantly divided in two by a relatively narrow annular peripheral gap 46.

A final drive mechanism 50 constructed in accordance with the present invention includes firstly the rear drive wheel assembly 26. As shown best in FIG. 3, the rear drive wheel assembly defines an axially inner side portion 52, an axially outer side portion 54, and shaft means such as a shaft assembly 56 for releasably connecting the opposite side portions together and for defining the annular peripheral gap 46 between them radially outwardly of the shaft assembly. A vertical, longitudinally extending mid-plane 58 is located between the side portions substantially centrally of the annular gap. As is clearly illustrated, the inner side portion 52 defines a side wall 53 and a generally cylindrical flange 55 extending cantileverably therefrom, and the outer side portion 54 defines a side wall 57 and a similar flange 59 extending cantileverably therefrom and toward the other flange. Each of the peripherally disposed flanges preferably has a generally cylindrical band 61 of elastomeric or rubber material secured thereto that defines the substantially cylindrical envelope 44.

The final drive mechanism 50 secondly includes hollow frame means such as the hollow frame 60 illustrated in FIG. 3 for rotatably supporting the rear drive wheel assembly 26 laterally away from the central longitudinal plane 20 of the vehicle by extending solely radially inwardly through the relatively narrow annular peripheral gap 46. In the instant embodiment, the hollow frame 60 is a longitudinally extending and integrally cast part of the roller frame 30 and defines an enclosed compartment 63, although it can be appreciated that it could alternatively be fabricated or be releasably secured to the remainder of the roller frame without departing from the spirit of the present invention.

Thirdly, the final drive mechanism 50 includes a gear train 62 arranged within the enclosed compartment 63 of the hollow frame 60 on or near the mid-plane 58 for powerably rotating the rear drive wheel assembly 26 through a torque transmitting path directed radially inwardly through the annular peripheral gap 46 toward the transverse axis 42.

More particularly, as shown best in FIG. 4, the shaft assembly 56 of the rear drive wheel assembly 26 includes an axle shaft 64 defining an annular and radially outwardly extending flange portion 66, a radially inwardly facing tapered seal seat 68 within the annular flange portion, a cylindrical first bearing seat 70 and an external spline 72 at the outboard end thereof. A cylindrical second bearing seat 74 is defined at the inboard end of the shaft along with an external spline 76 and a threaded distal end 78. The outer side wall 57 of the wheel assembly is preferably releasably secured to the shaft flange portion 66 through a plurality of fasteners 80 screwthreadably received in the flange portion. An adapter or hub 81 is similarly releasably secured to the inner side wall 53 by fasteners 82, and this hub defines a radially inwardly facing tapered seal seat 84, a cylindrical third bearing seat 86, and an internal spline 88 adapted to intermesh with the external spline 76 on the axle shaft. An internally threaded nut 90 is received on the distal end 78 of the axle shaft, and a locking cover or cap 92 is releasably connected to the hub by a plurality of fasteners 94 so as to protect the nut and to restrain rotation thereof.

As shown in FIGS. 3, 4, 6 and 7, hollow frame 60 includes a contoured outer side wall 96 and a contoured inner side wall 98 located generally symmetrically at either side of the mid-plane 58. These side walls are integrally connected together by a contoured peripheral wall 100. Each of the side walls defines a cylindrical bore 102 therethrough symmetrically arranged along the transverse central axis 42, and the hollow frame further includes an outside cover 104 and an inside cover 106 which are insertable in the bores and releasably secured to the respective side walls by a plurality of fasteners 108 as shown in FIG. 4. An external spline 110 is formed interiorly on the outside cover, and a radially inwardly facing tapered seal seat 112 is formed exteriorly thereon so that a conventional pair of mating floating ring seals 114 can be individually engaged with the seal seats 112 and 68 and with each other to exclude dirt and retain lubricant within the enclosed compartment 63 of the hollow frame. The outside cover 104 also defines a shouldered bearing seat 116 adapted to receive the outer race of a tapered roller bearing assembly 118, while the inner race thereof is engaged with the bearing seat 70 on the shaft 64. The inside cover 106 defines a seal seat 120 like that of the outside cover so that a conventional pair of floating ring seals 122 can be engaged with the seal seat 120 and seal seat 84. A shouldered bearing seat 124 is defined within the inside cover to receive the outer race of a second tapered roller bearing assembly 126 while the inner race thereof is engaged with the bearing seat 86 on the hub 81.

Referring next to FIG. 3, the gear train 62 is driven by a hydraulic drive motor 128 releasably secured to the inner side wall 98 in a cantilevered fashion. This drive motor can be of almost any construction, but preferably is a fixed displacement hydraulic motor driven by a variable displacement pump, not shown, in a well known manner. The drive motor has an output shaft 130 adapted to be releasably received within an input gear 132. The input gear is supported for rotation about an input axis 133 by laterally spaced roller bearing assemblies 134 and 136 in the side walls 98 and 96 through intermediate annular bearing cages 138 and 140 respectively. The input gear has an outer splined extension 142 adapted to be selectively coupled to the hollow frame 60 by a spring engaged and hydraulically released disc brake assembly 144 of the usual type so that it need not be described in detail. The input gear is intermeshed with an idler gear 146 rotatably mounted on a roller bearing assembly 148. This roller bearing assembly is supported on a shaft 150 connected to the outer side wall 96 and contained axially by a cap 152 mounted on the inner end of the shaft and connected to the inner side wall 98. Advantageously, the inner cage 138 retains the cap 152 axially in place while the outer cage 140 axially retains the shaft 150.

Referring now to FIGS. 4 and 5, the gear train 62 also includes a cluster gear 154 having an outboard larger diameter gear 156 driven by the idler gear 146 and an inboard smaller diameter gear 158 releasably connected together by a spline joint 160. The outer and inner side walls 96 and 98 are disposed in generally closely spaced parallel relation in the region of the annular gap 46 and immediately exteriorly of the wheel assembly 26 as is shown by the relatively narrow necked portion 161 of the hollow frame 60 as shown best in FIG. 6. However, the outer and inner side walls 96 and 98 are contoured to be axially spread apart radially inwardly of the outer and inner wheel flanges 59 and 55 to form an enlarged head portion or enlarged housing 163 with the peripheral wall 100 as can be appreciated by reference to FIG. 6. When viewing FIG. 4, for example, note that the contoured side walls 96 and 98 and the associated covers 104 and 106 are spaced apart within the wheel assembly such that they are located immediately radially within the respective flanges 59 and 55 and substantially centrally of the axial midpoints thereof. Since the opposed tapered bearing assemblies 118 and 126 are mounted radially within these covers, the bearing assemblies are also axially aligned with the midpoints of the flanges such that they are relatively widely spaced apart for better support of the wheel assembly. The outer side wall 96 is branched to form an inner wall extension 162, and a cylindrically stepped shaft 164 is mounted in the wall extension and in the inner side wall 98. A pair of roller bearing assemblies 166 and two tubular spacer elements 170, 172 are mounted on the shaft 164 axially between a shoulder 174 thereon and the wall extension 162, and the cluster gear 154 is rotatably mounted on these bearing assemblies. The shaft 164 is retained in place by the inside cover 106.

The gear train 62 further includes a second cluster gear 176 having an inboard larger diameter gear 178 driven by the smaller diameter gear 158 of the first cluster gear 154 and an outboard smaller diameter sun gear 180. For manufacturing and economical reasons the second cluster gear has a central hub 182 releasably connected to the larger gear 178 by a plurality of fasteners 184, and rotatably supported by a roller bearing assembly 186 mounted on the bearing seat 74 of the axle shaft 64. In turn, the hub is releasably connected to the elongate, tubular smaller gear 180 by a coupling spline joint 188.

Lastly, the gear train 62 includes a planetary gear set 190 driven by the smaller sun gear 180. A plurality of planet gears 192 are rotatably mounted on a planet carrier 194 having an internal spline 196 for intermeshing engagement with the external spline 72 of the axle shaft 64. The planet gears intermesh with the sun gear 180 and a ring gear 198, and the ring gear is nonrotatably coupled to the external spline 110 on the outside cover 104. Note is made that the ring gear is adapted to limitedly float axially between the inner wall extension 162 and the outer side wall 96 since it is trapped therebetween, and that the sun gear 180 is adapted to limitedly float radially within the planet gears 192 since there is no bearing assembly radially between the sun gear and the axle shaft at the outer end thereof. This contributes to better load distribution within the teeth of the gears of the planetary gear set.

INDUSTRIAL APPLICABILITY

In operation, the hydraulic drive motor 128 can drive the input gear 132 shown in FIG. 3 at any speed within a preselected speed range. Preferably, the gear train 62 driven by the motor 128 has at least two stages of speed reduction gearing located radially within the envelope 44 of the wheel assembly 26. The various stages of speed reduction from the drive motor and the input gear to the axle shaft 64 can best be appreciated by going through the power path of the gear train 62 by assuming the following numbers of gear teeth for the designated gears:

input gear 132: 24 teeth
idler gear 146: 56 teeth
large gear 156: 57 teeth
small gear 158: 24 teeth
large gear 178: 86 teeth sun gear 180: 30 teeth
Ring gear 198: 84 teeth If the input gear 132 is rotated at 3,000 r.p.m. then the idler gear 146 will rotate at (24/56)(3,000) or 1286 r.p.m. for a first stage of speed reduction. The idler gear will rotate the first cluster gear 154 at about this same speed, or at (56/57)(1,286) or 1,263 r.p.m. and can be disregarded as a stage for this particular embodiment. The second significant stage of speed reduction is between the small gear 158 of the first cluster gear and the large gear 178 of the second cluster gear. Specifically, the large gear 178 will be rotated at (24/86)(1,263) or 352.5 r.p.m. The sun gear 180 is driven at that speed, and with the ring gear 198 held stationary as a reaction the planet carrier 194 and axle shaft 64 are driven at (352.5)−(84/30+1) or at 92.8 r.p.m. for a third stage of speed reduction. This gives an overall speed reduction ratio of about 32.3:1. The gears of the gear train 62 can be sized, however, to provide a range of reductions from about 20:1 to about 40:1 rather conveniently.

It can be appreciated with reference to FIG. 3 that the inner and outer side portions 52, 54 of the wheel assembly 26, and the inner and outer side walls 98, 96 are arranged at the laterally opposite sides of the verticle mid-plane 58 in a generally symmetrical manner. Thus, relatively high tension loads on the drive belt 28 are transferred through the desirably widely laterally spaced roller bearing assemblies 126 and 118 into the respective covers 106 and 104. From the covers, these loads or forces are transmitted in a balanced symmetrical manner to the inner and outer side walls and generally longitudinally and forwardly into the roller frame 30 shown in FIG. 1. Such symmetrical and centered transferring of forces from the drive belt reduces the deflections of the hollow frame 60 in use and allows smaller or lighter members thereof.

It is evident that the entire gear train 62 is compactly contained within the enclosed compartment 63 between the side walls 96 and 98 of the hollow frame 60 and generally adjacent the mid-plane 58. In other words, no portion of the supporting hollow frame reaches laterally beyond either the inner or outer side portions 52 and 54 of the wheel assembly 26 so that the overall width of the final drive mechanism 50 is minimized. Note that only two narrow and longitudinally connected gears 132 and 146 are required to transfer power from the drive motor 128 through the relatively narrow neck portion 161 of the hollow frame 60. The wet disc brake assembly 144 is located along the input axis 133 laterally outwardly of the input gear 132 but within the space envelope or width of the drive belt 28 as can be noted by reference to FIGS. 2 and 3. Simultaneously, the drive motor 128 is located laterally inwardly of the input gear along the input axis, but at such an elevated and forward location relative to the car body 14 that it is in a relatively protected location even though it extends laterally inwardly beyond the width of the drive belt.

It is contemplated that the final drive mechanism 50 of the present invention is capable of rotatably driving a number of conventional multi-jointed metal track chains as well as the endless elastomeric drive belt 28 illustrated. Accordingly, by the terms drive belt or belted vehicle as used herein, it is meant to include a vehicle having any belt or track chain that is formed into a closed loop and entrained about a substantial portion of the periphery of the wheel side portions 52 and 54. In this regard, the periphery of each side portion could be provided with drive teeth such as those on conventional sprockets, although not shown, to more positively engage the drive belt. In every case, however, there is a radially inwardly directed torque path to the wheel assembly and essentially split torque paths directed radially outwardly through the side portions to drive the belt at two transversely displaced locations.

We also contemplate replacing the hydraulic drive motor 128 with a coupling joint so that the input gear 132 can be driven by a drive shaft emanating from a wide variety of mechanical transmissions without departing from the spirit of the present invention.

Other aspects, objects, and advantages of this invention can be obtained from a study of the drawings, the disclosure, and the appended claims.

We claim:

1. A final drive mechanism for a vehicle having a central longitudinal plane, comprising:

a wheel assembly defining a substantially cylindrical envelope including an axially inner side portion having an inner side wall and an inner peripheral flange extending therefrom, an axially outer side portion having an outer side wall and an outer peripheral flange extending therefrom and toward the inner peripheral flange, and shaft means for releasably connecting the side portions together and defining a relatively narrow annular peripheral gap between the flanges that divides the envelope in two;

hollow frame means for supporting the wheel assembly on the vehicle laterally away form the plane for rotation about a generally transverse axis by extending radially inwardly through the gap and for defining an enclosed comaprtment, the hollow frame means including a relatively narrow neck portion extending through the gap and an enlarged head portion located within the wheel assembly; and gear train means for powerably rotating the wheel assembly through a torque transmitting path directed radially inwardly through the gap, the gear train means being located substantially within the encoosed compartment of the hollow frame means and including a speed reducing planetary gear set located within the envelope of the wheel assembly.

2. The final drive mechanism of claim 1 wherein the shaft means includes an axle shaft and the planetary gear set includes a ring gear nonrotatably connected to the hollow frame means and a planetary carried coupled to rotated with the axle shaft and adapted to drive the wheel assembly.

3. The final drive mechanism of claim 2 wherein the gear train means includes a cluster gear located generally within the enlarged head portion and defining a relatively small diameter sun gear for forming a part of and driving the planetary gear set and a relatively large diameter gear.

4. The final drive mechanism of claim 3 wherein the gear train means includes another cluster gear located generally within the enlarged head portion and defining a relatively small diameter gear connected to the large diameter gear of the cluster gear and a driven relatively large diameter gear.

5. The final drive mechanism of claim 1 wherein the gear train means includes first and second interconnected cluster gears located generally within the enlarged head portion of the hollow frame means.

6. The final drive mechanism of claim 5 wherein a vertical, longitudinal mid-plane is defined generally centrally of the annular peripheral gap and the first cluster gear includes a relatively large diameter gear located substantially on the mid-plane.

7. The final drive mechanism of claim 6 wqherein the first cluster gear includes a relatively small diameter gear and the second cluster gear includes a relatively large diameter gear intermeshingly engaged with the relatively small diameter gear.

8. The final drive mechanism of claim 7 wherein the second cluster gear includes a relatively small diameter gear and the second cluster gear is rotatably mounted on the shaft means.

9. A final drive mechanism for a vehicle having first and second wheel assemblies and a drive belt entrained about the wheel assemblies, comprising:
   the first wheel assembly including an inner side portion, an outer side portion, means for releasably connecting the side portions together and defining an annular peripheral gap therebetween;
   hollow frame means for supporting the first wheel assembly for rotation about a central axis, the hollow frame means extending generally radially inwardly toward the central axis through the gap and including an inner bearing assembly and an outer bearing assembly along the axis for transferring forces from the drive belt upon the side portions to the hollow frame means; and
   a gear train for powerably rotating the first wheel assembly, the gear train passing radially inwardly through the gap within the hollow frame means and including a first cluster gear, a second cluster gear and a planetary gear set disposed in serially connected relation within the first wheel assembly.

10. The final drive mechanism of claim 9 wherein the hollow frame means includes an inner side wall and an outer side wall individually defining a bore therethrough on the axis, and inner and outer members releasably secured to the respective side walls in covering relation to the respective bores and supporting the inner and outer bearing assemblies, respectively.

11. The final drive mechanism of claim 9 wherein the side portions of the first wheel assembly individually define a substantially cylindrical peripheral flange, and the hollow frame means defines wall means substantially radially aligned with the axial midpoints of the flanges for supporting the bearing assemblies.

12. A final drive mechanism comprising:
   a wheel assembly having an axially inner side portion and a generally cylindrical flange connected thereto and an outer side portion and a generally cylindrical flange connected thereto and defining a substantially cylindrical envelope and a relatively narrow annular peripheral gap between the flanges;
   hollow frame means for rotatably supporting the wheel assembly by extending solely radially inwardly between the flanges through the gap, the hollow frame means defining an enlarged head portion within the wheel assembly; and
   gear train means mounted within the hollow frame means for powerably rotating the wheel assembly and including a plurality of interconnected gears located within the hollow frame means and defining at least two speed reduction gear sets located within the enlarged head portion.

13. The final drive mechanism of claim 12 wherein the plurality of interconnected gears includes first and second cluster gears directly intermeshing with each other within the enlarged head portion.

14. The final drive mechanism of claim 13 wherein the plurality of interconnected gears includes a ring gear, a plurality of planet gears intermeshing with the ring gear, and the second cluster gear defines a sun gear intermeshing with the planet gears.

15. The final drive mechanism of claim 12 wherein the plurality of interconnected gears includes a sun gear, a ring gear, and a plurality of planet gears intermeshing with the sun gear and the ring gear.

16. The final drive mechanism of claim 15 wherein the wheel assembly includes an axle shaft, and the gear train means includes a planet carrier for rotatably supporting the planet gears and means for releasably coupling the planet carrier to the axle shaft.

17. The final drive mechanism of claim 15 wherein the ring gear is nonrotatably connected to the hollow frame means with limited movement to float.

18. A final drive mechanism comprising:
   hollow frame means defining an outer side wall and an inner side wal located at either side of a vertical and longitudinally extending mid-plane passing generally between them, the side walls being connected by a peripheral wall to define a relatively narrow neck portion and an enlarged head portion;
   a wheel assembly mounted on the side walls for rotation about a central axis and having a generally cylindrical inner side portion and a generally cylindrical outer side portion at either side of the mid-plane and exteriorly of the side walls; and
   gear train means for powerably rotating the wheel assembly and including a planetary gear set located between the walls and within the enlarged head portion and having a ring gear nonrotatably connected to the outer side wall, a planet carrier connected for joint rotation with the wheel assembly, an input sun gear, and a plurality of planet gears.

19. The final drive mechanism of claim 18 wherein the gear train means includes a cluster gear defining the sun gear and a first gear of larger diameter than the sun gear, and means for rotataby mounting the cluster gear within the wheel assembly so that the sun gear can limitedly float in the radial direction.

20. The final drive assembly of claim 19 wherein the gear train means includes another cluster gear defining a second gear intermeshing with the first gear and a third gear of larger diameter than the second gear, the third gear being located generally on the mid-plane.

* * * * *